United States Patent
Ascherin et al.

[11] Patent Number: 6,059,266
[45] Date of Patent: *May 9, 2000

[54] RECOVERY DEVICE

[76] Inventors: Terry C. Ascherin, 8208 Jayseel St., Sunland, Calif. 91040; Russ Anderson, 324 Foothill Ave., Sierra Madre, Calif. 91024

[ * ] Notice: This patent is subject to a terminal disclaimer.

[21] Appl. No.: 09/064,024

[22] Filed: Apr. 21, 1998

Related U.S. Application Data

[63] Continuation-in-part of application No. 08/717,753, Sep. 23, 1996, Pat. No. 5,762,297.

[51] Int. Cl.⁷ ........................................................ B66D 1/36
[52] U.S. Cl. ........................ 254/334; 254/326; 254/380; 242/397.5
[58] Field of Search ..................... 254/323, 325, 254/326, 334, 335, 380; 242/397, 397.5, 398, 403; 280/477

[56] References Cited

U.S. PATENT DOCUMENTS

| | | | |
|---|---|---|---|
| 13,429 | 8/1855 | Gesner | 254/334 |
| 537,730 | 4/1895 | Stevens | 254/334 X |
| 1,194,893 | 8/1916 | Stalker | 254/325 |
| 3,753,551 | 8/1973 | Tidwell | 254/334 |
| 4,597,562 | 7/1986 | Joyce | 254/334 |
| 5,085,408 | 2/1992 | Norton et al. | 254/334 X |
| 5,435,450 | 7/1995 | Delcambre | 254/334 X |
| 5,603,488 | 2/1997 | O'Rourke et al. | 254/334 |
| 5,772,183 | 6/1998 | Sears | 254/323 X |

FOREIGN PATENT DOCUMENTS 188104  12/1936  France ................................. 254/325

OTHER PUBLICATIONS

CMC Rescue Products Catalog, date unknown, 4 pages.
"Tripods & Winches" Catalog, date unknown, 1 page.
Kong Catalog, date unknown, 2 pages.
Rescue Systems, Inc., 1988, 3 pages.
Kong Advertisement, Technical Rescue Journal, Spring 1998, 2 pages.

*Primary Examiner*—Donald P. Walsh
*Assistant Examiner*—Emmanuel M. Marcelo
*Attorney, Agent, or Firm*—Blakely, Sokoloff, Taylor & Zafman, LLP

[57] ABSTRACT

A recovery device particularly useful in confined space and remote rescues. The recovery device includes a base plate, a winch coupled to the base plate, and an anchoring plate coupled to the base plate to detachably couple the base plate to an object that will support the recovery. A cord is attached to the winch to raise or lower the load to or from the recovery device or object. A guide roller assembly is coupled to the base plate to guide the cord and reduce the amount of friction on the cord that occurs when raising a load with the winch.

13 Claims, 15 Drawing Sheets

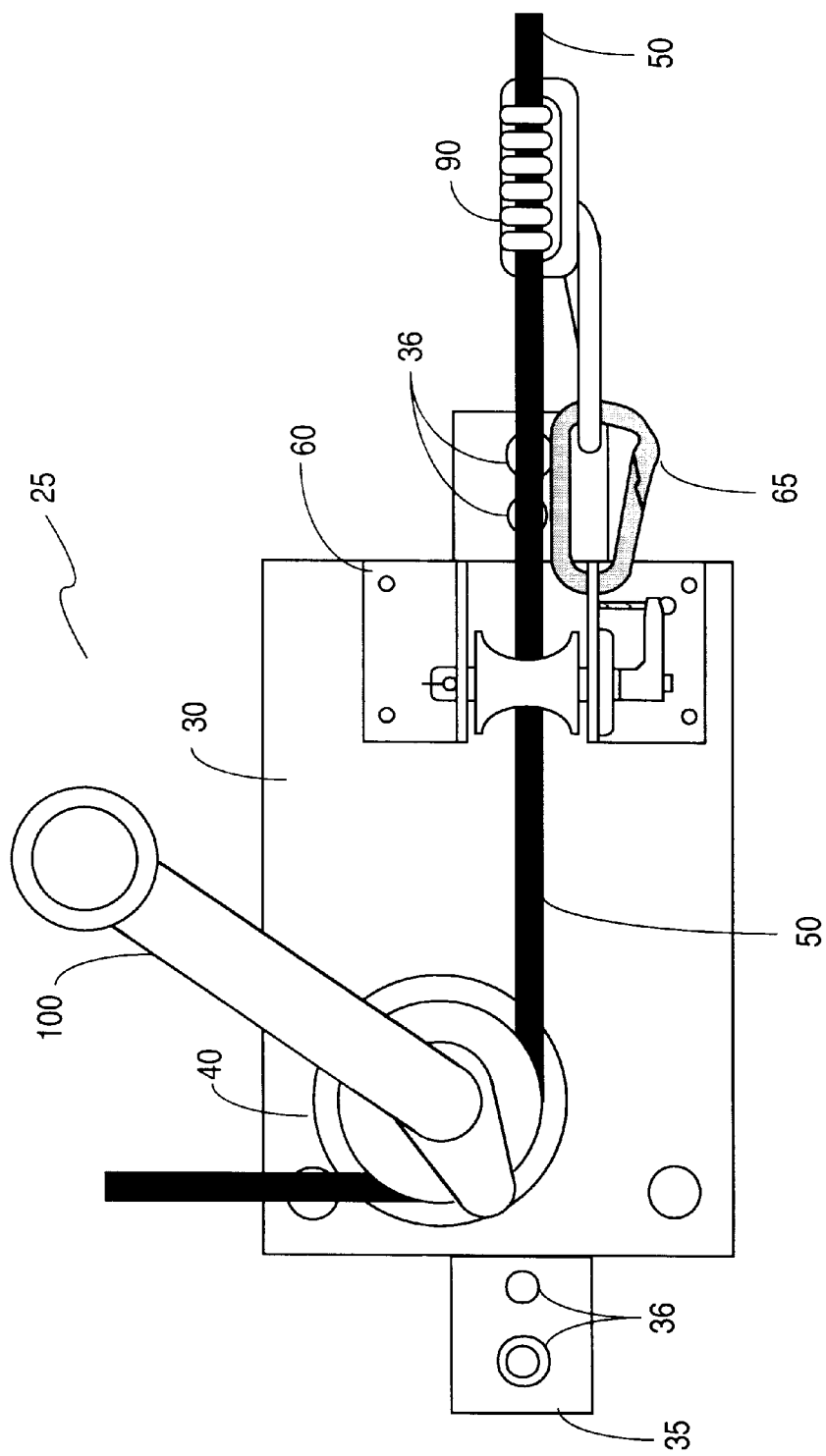

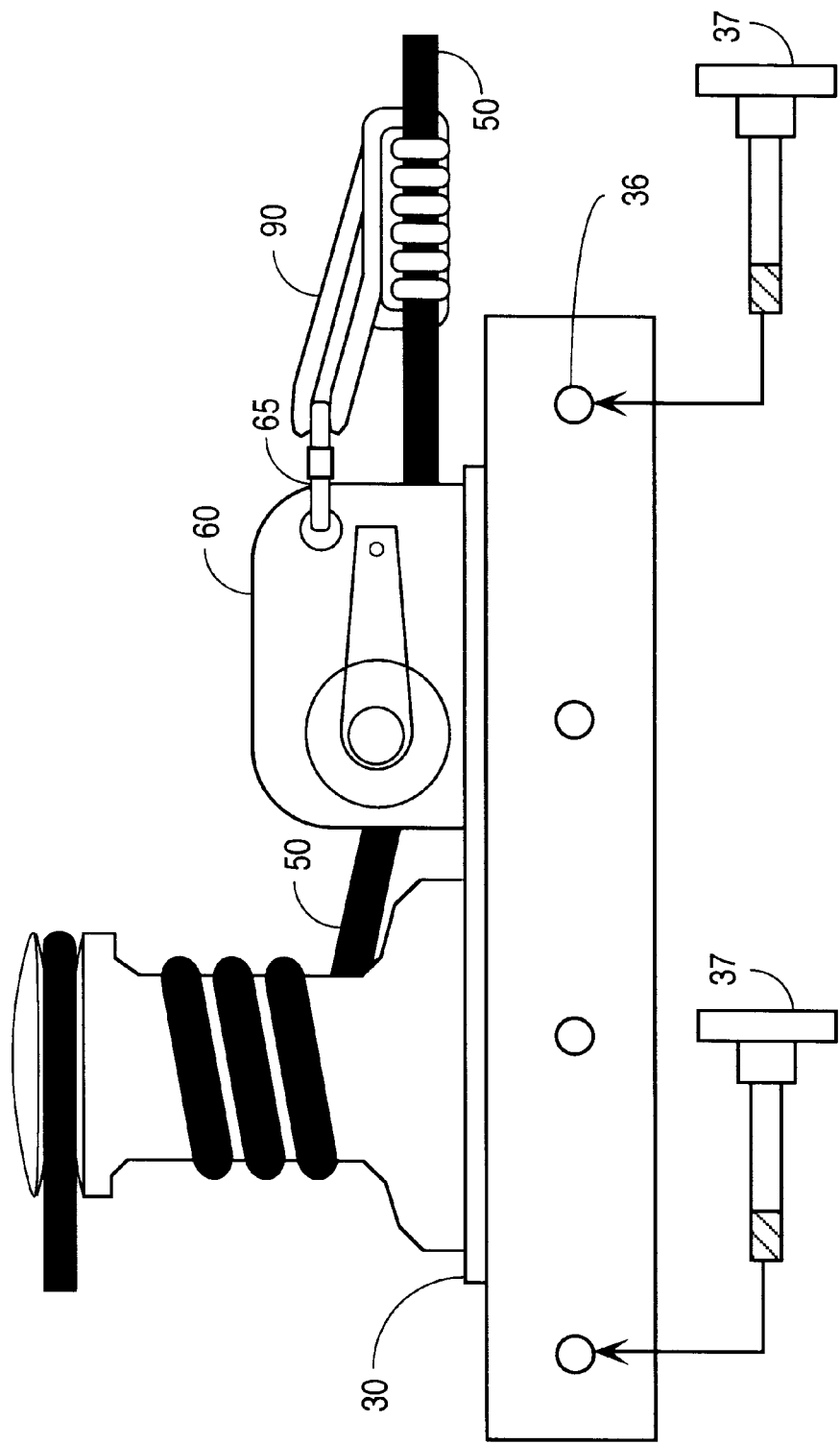

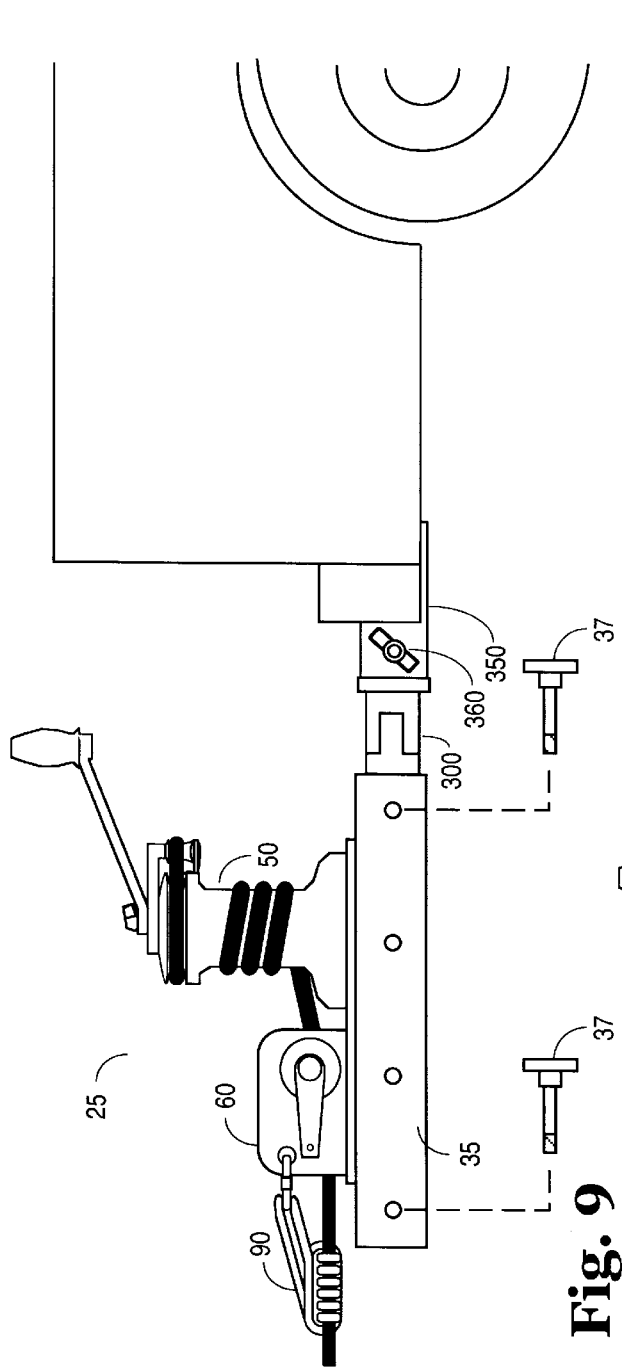
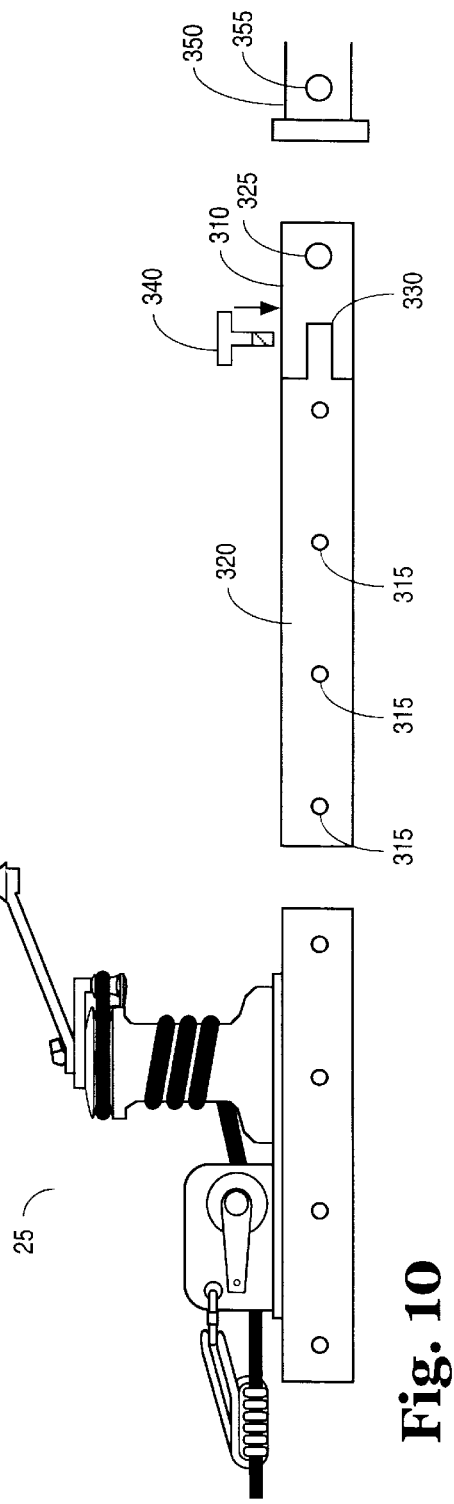
Fig. 9
Fig. 10

RECOVERY DEVICE

RELATED APPLICATION

The a pplication is a continuation-in-part of application Ser. No. 08/717,753 filing date Sep. 23, 1996 U.S. Pat. No. 5,762,297 titled Recovery Device for Use in an Airborne Vehicle.

BACKGROUND OF THE INVENTION

1. Field of the Invention

The invention relates generally to the movement of loads and more particularly, to devices and systems for accomplishing the movement of loads.

2. Background Information

A winch provides a stationary hoisting machine from which a load may be raised or lowered by wrapping a cord or rope around a drum. Such devices are commonly used in rescue operations. However, such devices generally require a great deal of area to set up and maneuver the winch assembly and considerable time to set the system up for proper operation. There is needed a device for raising or lowering a load that may be used in a confined area and may be assembled and put in place in short order.

SUMMARY OF THE INVENTION

The invention relates to a recovery device particularly useful in confined space and remote rescues. The recovery device includes a base plate, a winch coupled to the base plate, and an anchoring plate coupled to the base plate to detachably couple the base plate to an object that will support the recovery. A cord is attached to the winch to raise or lower the load to or from the recovery device or object. A guide roller assembly is coupled to the base plate to guide the cord and reduce the amount of friction on the cord that occurs when raising a load with the winch.

The recovery device is particularly useful with a confined space derek load management system such as, for example, a tripod (three leg) or quadpod (4 leg) system. The recovery device may be quickly and easily secured or coupled directly to a leg of the tripod to reduce the amount of area or space needed to complete the recovery. The recovery device may also be coupled to a vehicle trailer hitch receiver. In this manner, in remote areas or inadequate work space environments, the recovery device can be coupled to a vehicle to support the recovery.

The recovery device may also be coupled to a support object resembling a letter "H." In this manner, the device can be quickly transported to remote off-road or into backcountry environments for recovery support.

BRIEF DESCRIPTION OF THE DRAWINGS

FIG. 2A is a planar top view of an embodiment of the recovery device of the invention.

FIG. 2B is a planar side view of an embodiment of the recovery device of the invention.

FIG. 9 is a planar side view of a second embodiment of the invention showing an embodiment of the recovery device of the invention coupled to a first embodiment of a vehicle trailer hitch receiver.

FIG. 10 is an exploded planar side view of an embodiment of the recovery device of the invention coupled to a first embodiment of a trailer hitch sleeve which in turn is coupled to a vehicle trailer hitch receiver.

FIG. 12b is a planar side view of a portion of the assembly of FIG. 12a.

DETAILED DESCRIPTION OF THE INVENTION

Figure 1A:
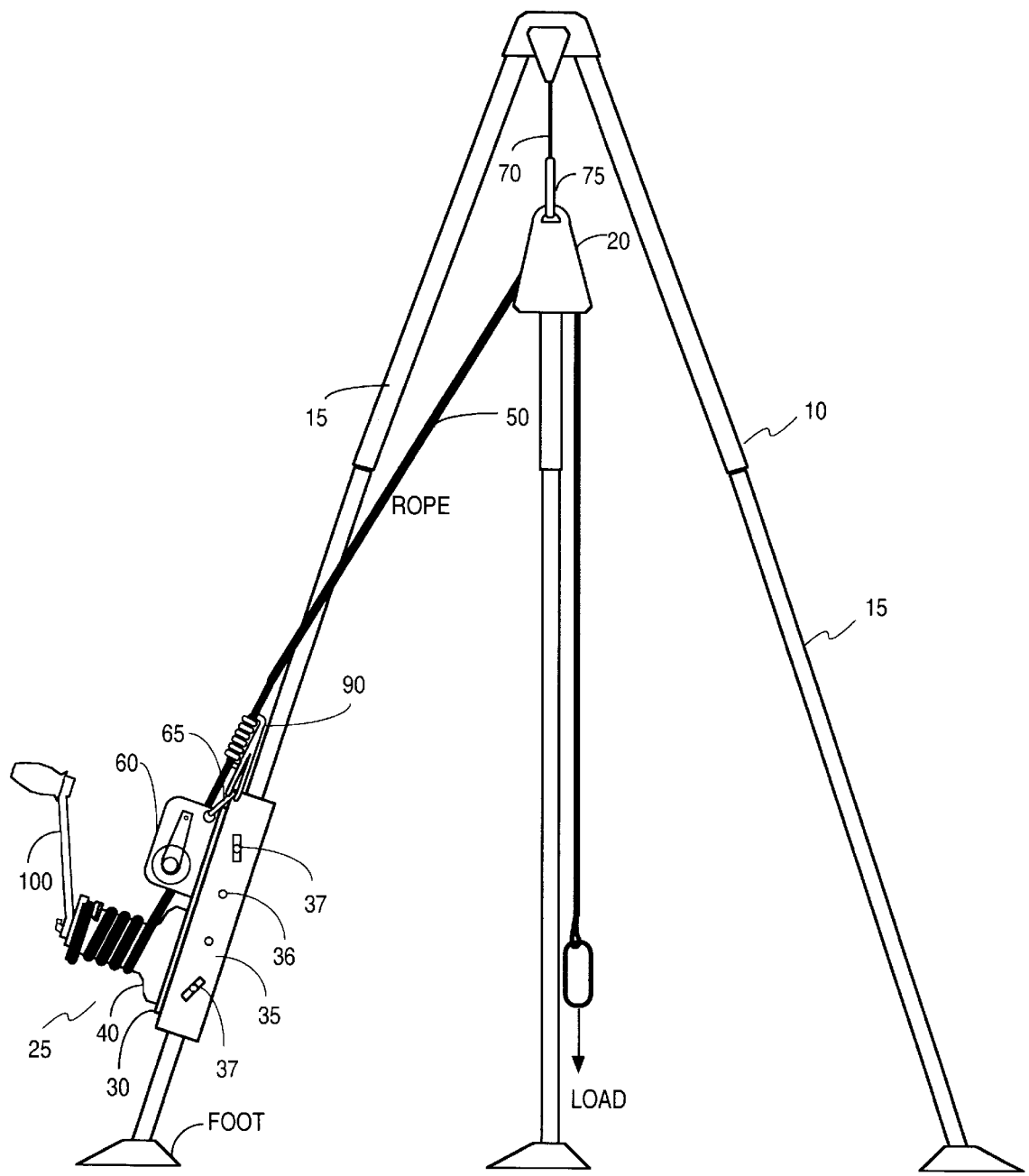
FIG. 1A is a view of a tripod load management system illustrating a side view of the installation of the recovery device of the invention.
Figure 1B:
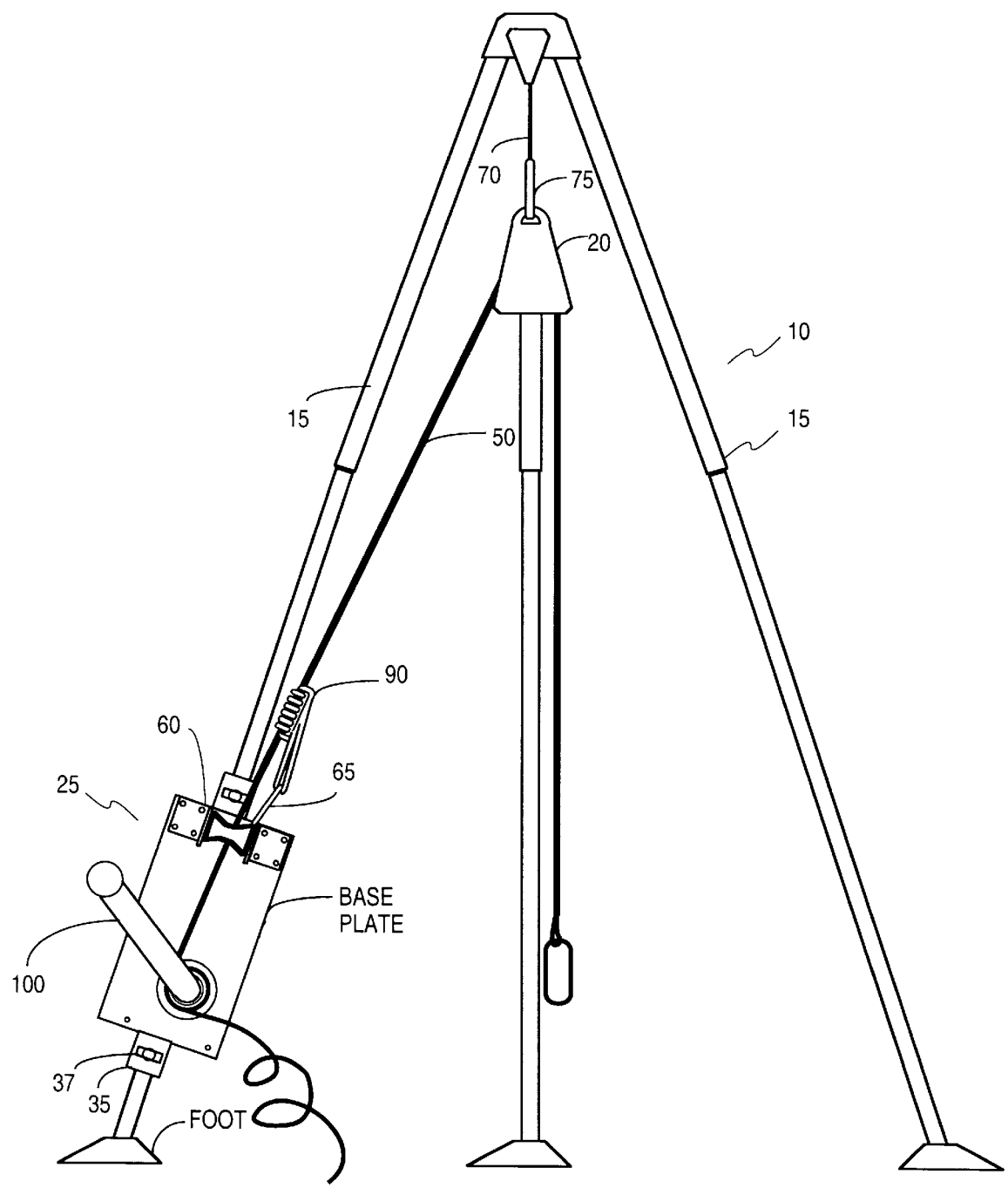
FIG. 1B is a tripod load management system illustrating a front view of the installation of the recovery device of the invention.

FIGS. 1a and 1b illustrate the recovery device of the invention as it would be used in a tripod load management system. FIGS. 1a and 1b present different views of tripod 10. Tripod 10 includes three legs 15 extending outwardly from an apex of tripod 10. Attached to the apex is pulley 20, such as a Prussick-minding pulley. Prussick-minding pulleys are well-known to persons of ordinary skill in the mountaineering and life-saving disciplines. Prussick-minding pulley 20 is attached to web loop or hard point 70 at the base of the apex of tripod 10. Prussick-minding pulley 20 is preferably attached to web loop or hard point 70 by a carabiner 75, the carabiner 75 allowing a quick and easily installed, detachable connection to web loop or hard point 70.

Recovery device 25 of the invention is detachably coupled to one leg 15 of tripod 10. Recovery device 25 includes a manually operated winch 40 with winch handle 100. Wrapped around winch 40 is cord 50 that is, for example, a nylon or dacron rope capable of supporting a 10,000 pound load without breaking. A standard one-half inch static, kernmantle rope used throughout the Fire Rescue, and Urban Search and Rescue communities is suitable. Cord 50 extends through guide roller assembly 60 that is attached to recovery device 25. Guide roller assembly 60 serves to guide cord 50 onto the bottom edge of the hub of winch 40. Guide roller assembly 60 also reduces the amount of friction on cord 50 that occurs when raising a load with winch 40. Cord 50 extends through pulley 20 attached to the apex of tripod 10. Cord 50 may then be attached to a load to raise or lower the load to or from tripod 10, respectively.

The system shown in FIGS. 1a and 1b further includes a second cord 90 tied at one end in the form of a Prussick knot. The Prussick knot of second cord 90 is connected to cord 50 as the cord extends from guide roller assembly 60 towards pulley 20. The other end of second cord 90 is tied or coupled to guide roller assembly 60, for example, by a carabiner. Prussick knot 90 provides a safety device to keep a load from falling if there is a malfunction or a catastrophic failure of winch 40 or of any part of recovery device 25. Prussick knots are well-known in the art of mountaineering, and, in this system, serve to grip or clamp down on cord 50 in the event of a malfunction on the winch side of pulley 20. The Prussick knot system also allows cord 50 to be exchanged under load conditions by clamping down on cord 50 when the direction of cord 50 is reversed (i.e., when the force applied on the winch side of pulley 20 is released).

FIGS. 1a and 1b illustrate the use of the recovery device in a system that may quickly and easily be installed to a leg 15 of tripod 10. In one embodiment, the recovery device is designed to be fastened to holes provided in leg 15 of tripod 10. In general, tripod 10 will have at least a two-leg system for each leg, each part of the leg system having a number of equally spaced holes on each leg, the holes designed to adjust the length of each leg by mating holes on different parts of the leg system with a pin or bolt. Unused or available holes on either part of the leg system of each leg are available for use by recovery device 25.

In one embodiment, recovery device 25 includes U-shaped mating member 35 coupled to the bottom side portion of base plate 30. U-shaped mating member 35 is coupled to base plate 30 to form a groove to accommodate one leg 15 of tripod 10. U-shaped mating member 35 also includes, in this embodiment, a number of holes corresponding to the spacing of holes of similar diameter on leg 15. Once recovery device 25 is placed on tripod 10 with leg 15 accommodated in U-shaped mating member 35 and at least one hole of leg 15 is aligned with one hole of U-shaped mating member 35, a pin or anchor bolt is inserted and secured through the aligned holes to couple recovery device 25 to tripod 10. In the embodiment shown in FIG. 1a, holes 36 are placed in adjacent walls of U-shaped member 35 and securing pin or bolt 37 is placed through one wall of U-shaped mating member 35, through leg 15 and tripod 10, and through a second wall of U-shaped mating member 35 and secured. In the embodiment shown in FIG. 1b, U-shaped mating member 35 extends beyond the length of base plate 30. Holes are placed in the base of U-shaped mating member 35, particularly on the portions of U-shaped mating member 35 extending from either end of base plate 30. It is to be appreciated that the holes in the base of U-shaped mating member 35 may be in addition to the holes in the walls of U-shaped mating member 35 (FIG. 1b). Securing pin or bolt 37 is placed through the base of U-shaped mating member 35 and through leg 15 and secured.

FIGS. 2a and 2b illustrate different views of recovery device 25 of the invention. Recovery device 25 includes winch 40 coupled to base plate 30. Winch 40 is preferably a manually-operated winch as shown in FIG. 2a, but could also be a motorized winch, such as, for example, an electrically-operated winch. In one embodiment, for example, recovery device 25 may be supplied with a chuck to adapt a commercial electric drill motor to the top of winch 40 to electrically power (rotate) winch 40. Winch 40 includes a winch handle 100 that is, in one embodiment, detachably coupled to device 25 and may be placed on top of winch 40 to rotate winch 40 in a circular fashion to raise or lower load. Handle 100 may also be detachably coupled to base plate 30 for storing or carrying purposes so that handle 100 does not protrude from device 25. In operation, handle 100 is installed on top of winch 40.

Base plate 30 has an area large enough to accommodate winch 40, guide roller assembly 60, and U-shaped mating member 35. Addressing these concerns, base plate 30 and recovery device 25 is preferably of a compact size so as to be easily maneuverable about a job site.

Recovery device 25 includes a guide roller assembly 60 to guide cord 50 between winch 40 and the load and to reduce the amount of friction on cord 50 that occurs when raising a load with winch 40. In this embodiment, guide roller assembly 60 is located on the load side of recovery device 25.

At least one Prussick knot 90 is attached/tied to cord 50, primarily as a safety device in the event of a malfunction in the winch side of the pulley. The use of Prussick knot 90 also allows cord 50 to be exchanged under load conditions as explained below. In the embodiment shown in FIGS. 2a and 2b, Prussick knot 90 is coupled to guide roller assembly 60 by carabiner 65, thus making Prussick knot 90 easily detachable.

FIGS. 2a and 2b show different views of an embodiment of U-shaped mating member 35 coupled to base plate 30. In this embodiment, U-shaped mating member 35 includes holes 36 on its base and its side walls for anchoring recovery device 25 to, for example, leg 15 of tripod 10. It is to be appreciated that each hole in U-shaped mating member 35 need not be utilized to anchor recovery device 25 to tripod 10. Instead, one skilled in the art will recognize the minimum number utilized, with securing bolts or pins, to anchor recovery device 25. In FIG. 1a, for example, two holes in U-shaped mating member 35 have securing bolts or pins inserted through the holes.

Figure 3:
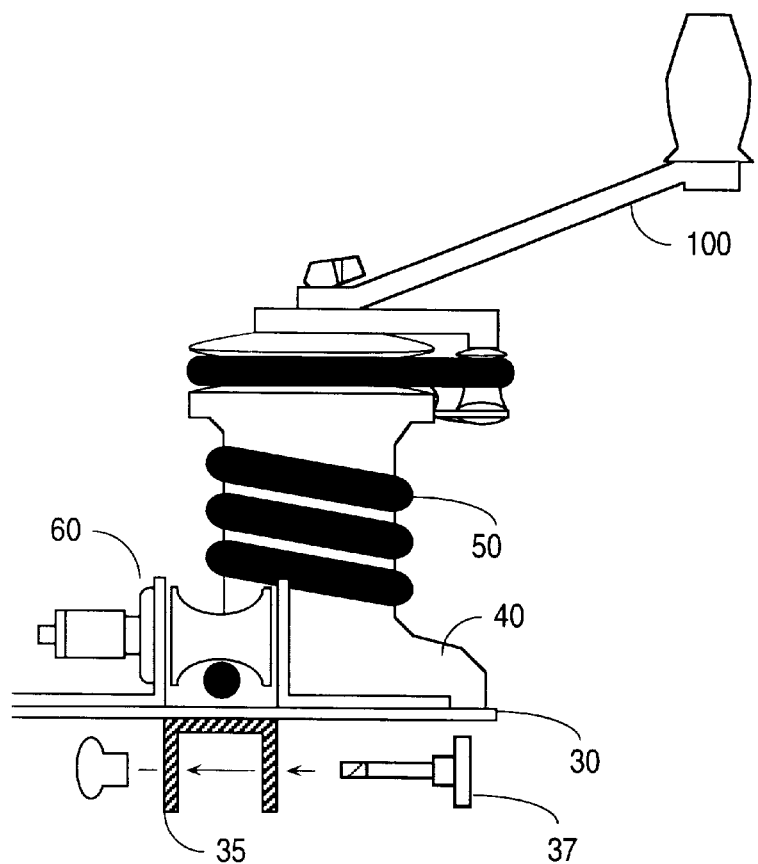
FIG. 3 is a planar side view of a manually-operated winch attached to the recovery device of the invention.

FIG. 3 illustrates a portion of recovery device 25 of the invention. The portion of recovery device 25 shown in FIG. 3 illustrates a planar side view of manually-operated winch 40 with cord 50 wrapped around winch 40 and extending through guide roller assembly 60. FIG. 3 also illustrates an embodiment of U-shaped mating member 35 coupled at its base to base plate 30. Holes are placed in the walls of U-shaped mating member 35 to allow the placement of bolt or pin 37 through one wall, through, for example, a hole in tripod leg 15, and through a hole in the second wall.

The following example sets forth the steps for attaching and operating recovery device 25 with a tripod load management system. First, the tripod system is set up as directed by the manufacturer over the job site, such as, for example, a confined space hole. The tripod is generally equipped with an anchoring system to anchor the tripod to the ground. Next, the most advantageous position of recovery device 25 is determined based on work area demands. To install recovery device 25 on a leg of tripod 10, winch 25 is placed on leg 15 with guide roller assembly 60 pointed toward the apex of tripod 10. Recovery device 25 is mounted by accommodating leg 15 of tripod 10 in U-shaped mating member 35 and aligning, in this example, at least two holes for anchor bolts. Next, a cord is placed through pulley 20 and pulley 20 is attached to web loop or hard point 70 at the apex of tripod 10 by carabiner 75. The cord is lowered to its desired length, placed through guide roller assembly 60, and wrapped with four coils of rope around winch 40 in a clockwise rotation. The rope is continually wrapped around winch 40 into a self-tailing groove. The self-tailing groove will manage the tension on the rope without an operator's constant hand pressure and supervision. A second rope 90 with Prussick knot is attached to rope 50 on the load side of guide roller assembly 60 and attached to guide roller assembly 60. The system is now ready to raise or lower a load.

Figure 4:
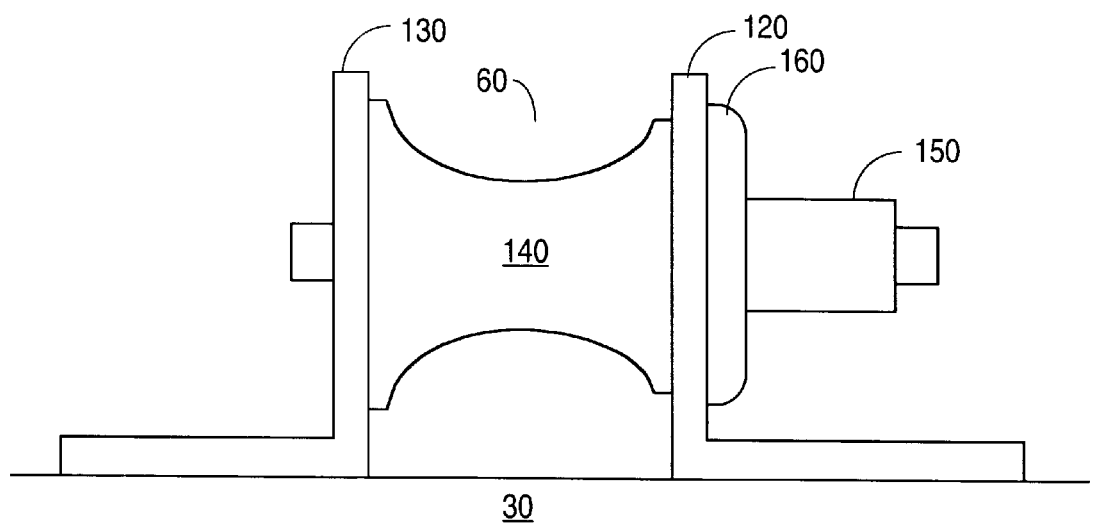
FIG. 4 is a planar side view of the guide roller assembly portion of the recovery device of the invention.
Figure 5:
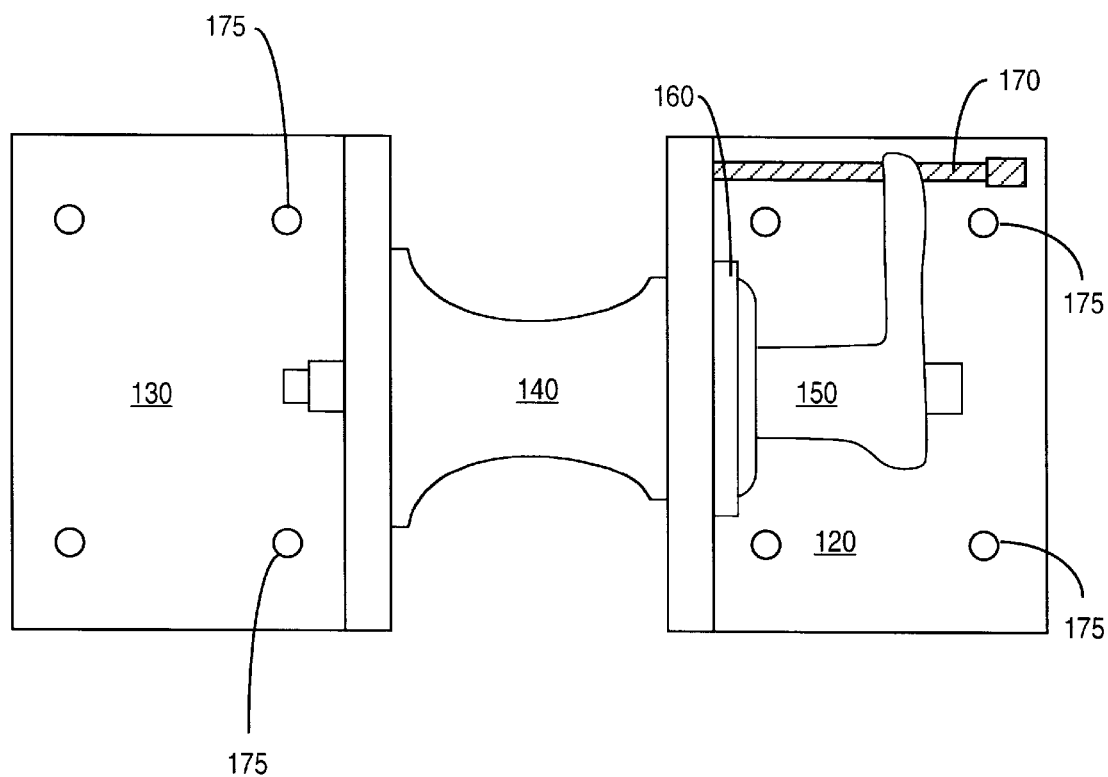
FIG. 5 is a planar top view of the guide roller assembly portion of the recovery device of the invention.
Figure 6:
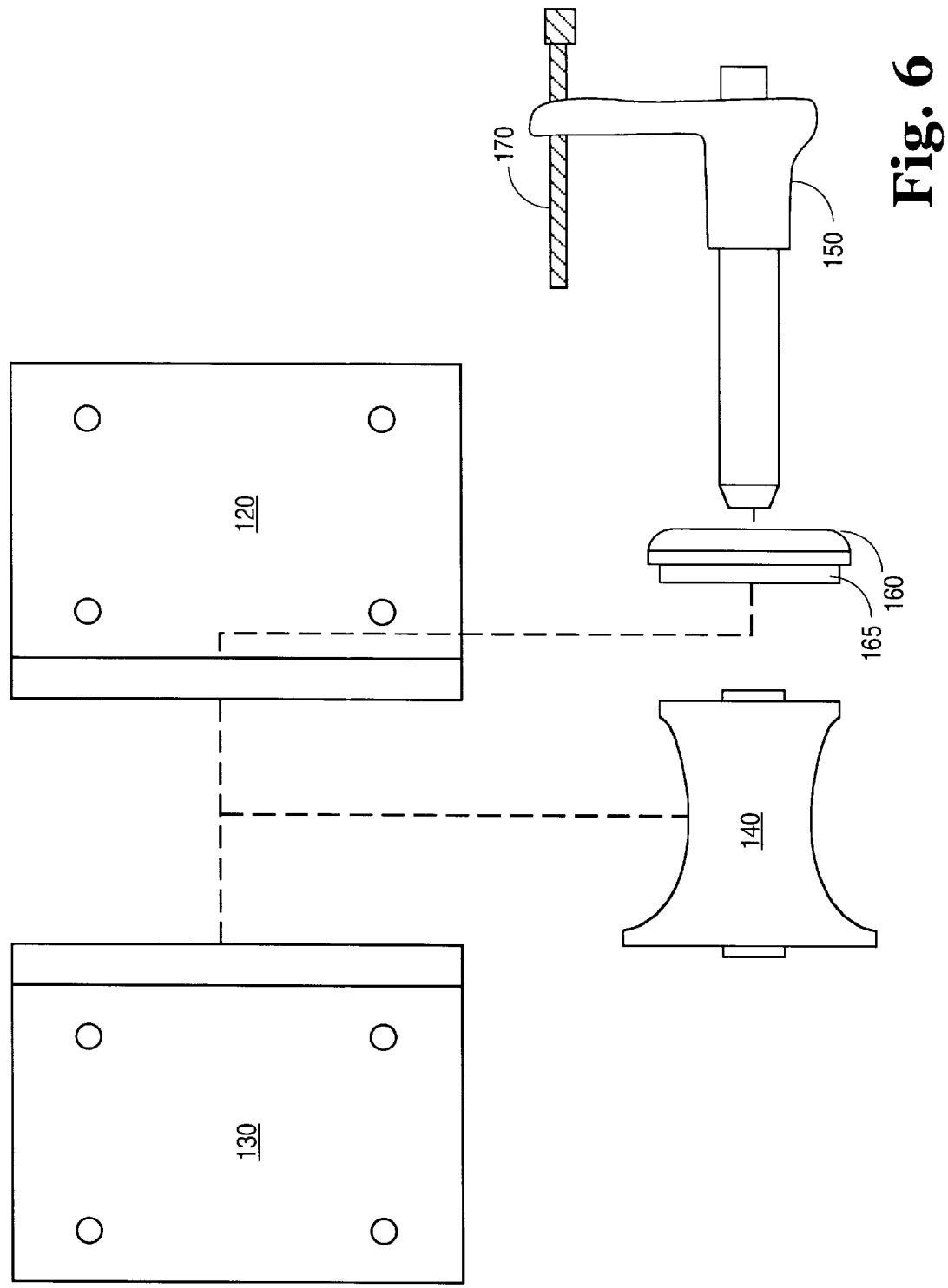
FIG. 6 is an exploded planar top view of the guide roller assembly portion of the recovery device of the invention.
Figure 7:
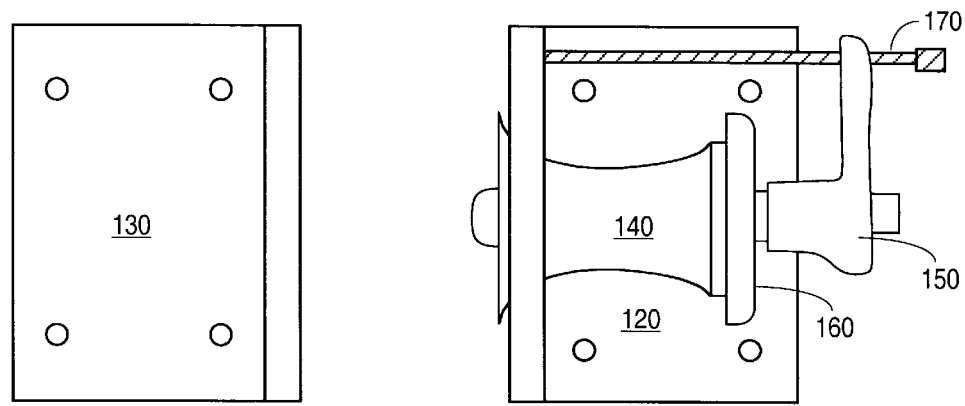
FIG. 7 is a planar top view of the guide roller assembly portion of the recovery device of the invention, wherein the roller portion has been removed from between opposing L-shaped angle supports.
Figure 8:
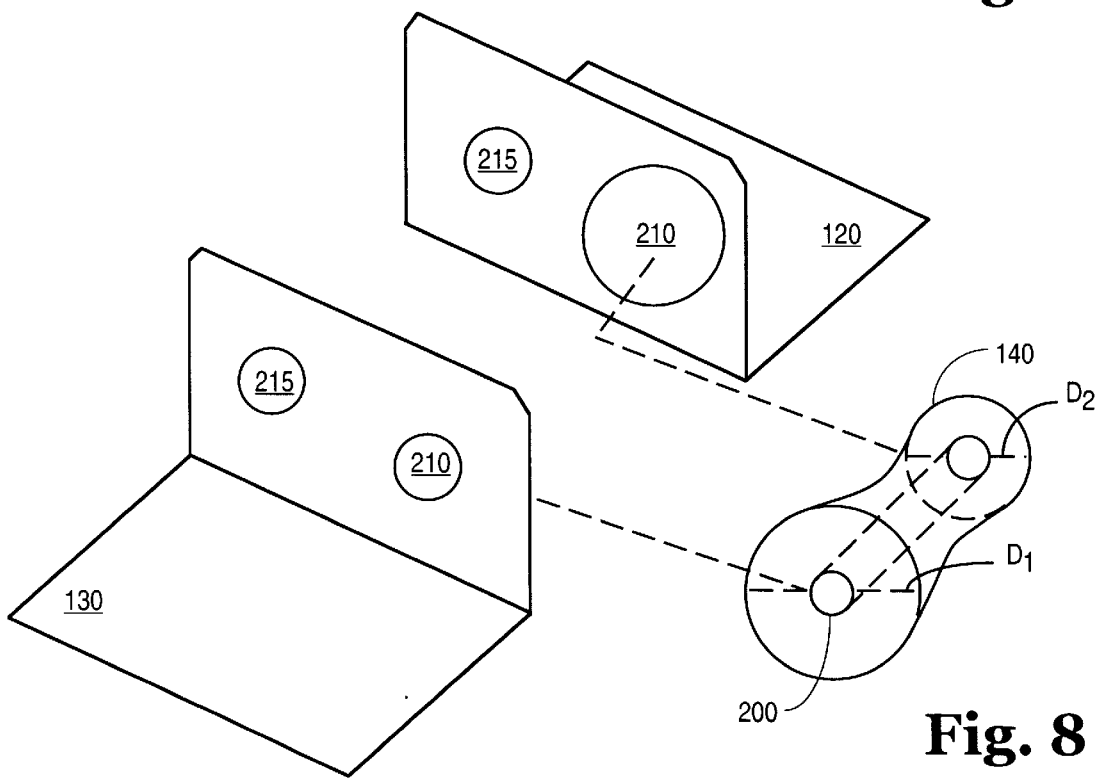
FIG. 8 is a perspective side view of a pair of opposing L-shaped angle supports of the guide roller assembly portion of the recovery device of the invention.

FIGS. 4–8 illustrate guide roller assembly 60 of the invention. FIG. 4 illustrates a planar side view of guide roller assembly 60 coupled to recovery device 25. FIG. 5 illustrates the planar top view of guide roller assembly 60. FIG. 6 illustrates an exploded planar top view of guide roller assembly 60. FIG. 7 illustrates a planar top view of guide roller assembly 60 in an open position to load a cord. FIG. 8 illustrates L-shaped angle supports 120 and 130 and roller 140 of guide roller assembly 60.

As noted above, guide roller assembly 60 includes a pair of L-shaped angle supports 120 and 130 and roller 140 between the pair of angle supports. L-shaped angle supports are secured to the base plate 30 of recovery device 25 through bolts or similar fasteners at openings 175. Roller 140 is preferably made of aluminum and has a substantially cylindrical shape with concave sides and an axial hole 200 extending through its length (see FIG. 8). At each end, oil-impregnated bronze bushings are located in the axial hole. The diameter of one end of roller 140 is larger than the diameter of the second end of roller 140. (In FIG. 8, $D_1$ is greater than $D_2$.) Guide roller assembly 60 further includes a securing rod extended through a hole in L-shaped angle support 120, through axial hole 200, through roller 140, and through L-shaped angle support 130. Securing rod 150 is preferably a ball-locked pin to secure roller 140 between the pair of angle supports 120 and 130, respectively.

Guide roller assembly 60 is designed so that parts will not be lost when recovery device 25 is installed in a recovery or other operation. Thus, as noted, guide roller assembly 60 is designed so that roller 140 has a diameter at one end that is greater than the diameter at the other end ($D_1$ is greater than $D_2$.) The smaller diameter ($D_2$) of roller 140 is sized so that it may fit through an opening 210 in L-shaped angle support 120 allowing roller 140 to be moved out of the path of cord 50 so that cord 50 may be put down and roller 140 placed over cord 50 in its appropriate position (see FIGS. 7 and 8). As illustrated in FIG. 7, securing rod 150 is pulled away from L-shaped angle support 130 and toward angle support 120. Roller 140 is also moved toward angle support 120 through opening 210 and out of the path of cord 50. The other end of roller 140 has a diameter $D_1$ that is larger than the opening 210 in L-shaped angle support 120 so that roller 140 cannot be completely removed through opening 210 in L-shaped angle support 120.

The invention contemplates that securing rod 150 and roller 140 may be slid out of the path of cord 50 to allow cord 50 to be placed under roller 140. Once cord 50 is positioned between the pair of angle supports 120 and 130, roller 140 is positioned over cord 50 and securing rod 150 is inserted into the opposite L-shaped angle support 130 securing guide roller assembly 60. To maintain roller 140 between the pair of L-shaped angle supports 120 and 130, a preferably aluminum flange 160 is positioned between securing rod 150 and the opening in L-shaped angle support 120. Roller flange 160 has a first exterior diameter that is greater than opening 210 in L-shaped angle support 120 so that roller 140 is secured between L-shaped angle supports 120 and 130 and does not move through opening 210 in L-shaped angle support 120. Roller flange 160 has a flange portion 165 with a second exterior diameter that fits within the opening 210 of L-shaped angle support 120. Flange portion 165 has a width approximately equivalent to the body of L-shaped angle support 120. Through the center of roller flange 160 is an axial hole having a diameter large enough to accommodate securing rod 150.

Guide roller assembly 60 also includes a mechanism to attach securing rod 150 to guide roller assembly 60 so that rod 150 is not lost during assembly of the recovery device. Preferably, the mechanism is a small diameter cable 170 coupled to rod 150 and L-shaped angle support 120. The length of cable 170 is sufficient to allow rod 150 to be removed from the path for cord 50 defined by opposing L-shaped angle supports 120 and 130.

By devising a mechanism whereby a cord may be placed in guide roller assembly 60 by dismantling guide roller assembly 60, placing cord 50, and reassembling guide roller 60, the invention allows the replacement of cord 50 under load conditions. L-shaped angle supports 120 and 130 also include second openings 215 to couple a second cord 90 with a Prussick knot. In this manner, a Prussick knot or knots may be coupled or tied to cord 50 and connected to L-shaped angle supports 120 and 130 via carabiner 65 through opening 215. Thus, under load conditions, tension on the winch side of second cord 90 may be released and the Prussick knot system will clamp onto cord 50 and hold cord 50 and the load at the angle support or supports 120 and 130. Securing rod 150 and guide roller 140 may then be removed from between L-shaped angle supports 120 and 130 and rope 50 removed from guide roller assembly 60. In this manner, a second rope may then be placed and assembled in guide roller assembly 60 and recovery device 25 while the first cord maintains the load. This mechanism allows additional flexibility in maneuvering a load.

FIGS. 9–11b illustrates a second embodiment of the invention wherein an embodiment of recovery device 25 is assembled to a vehicle trailer hitch receiver. In this embodiment, the invention contemplates the additional part of trailer hitch sleeve 300, having a portion 310 shaped to mate with a conventional (generally 2 inch by 2 inch rectangular) trailer hitch receiver 350. In this embodiment, sleeve 350 also includes an arm portion 320 that will accommodate U-shaped mating member 35 of recovery device 25. In one embodiment, arm portion 320 and mating portion 310 are each made of, for example, hollowed, hard aluminum or steel. Mating portion 310 includes an opening 325 that, when inserted in trailer hitch receiver 350, aligns with opening 355 in trailer hitch receiver 350 to allow a securing bolt or pin to be inserted through the body of trailer hitch receiver 350 and the body of mating portion 310 of sleeve 300. Similarly, arm portion 320 of sleeve 300 contains a number of holes 315 through its body portion to align with similar openings in U-shaped mating member 35 of recovery device 25. In this manner, securing bolts or pins may be inserted through holes in, for example, the walls or base of U-shaped mating member 35 and through the body of arm portion 320 of sleeve 300 to secure recovery device 25 to sleeve 300.

Arm portion 320 of sleeve 300 is connected to mating portion 310 by a knuckle joint 330 allowing arm portion 320 to rotate about a vertical axis at knuckle joint 330. In this manner, the position of trailer hitch receiver 350 and thus, a trailer to which it is attached, need not be directly aligned with the horizontal axis of trailer hitch receiver 350. The articulating joint formed at knuckle 330 allows, for example, rescues to utilize recovery device 25 in areas remote from the vehicle while allowing the vehicle to be placed in a manner close enough to support the rescue operations.

Figure 11A:
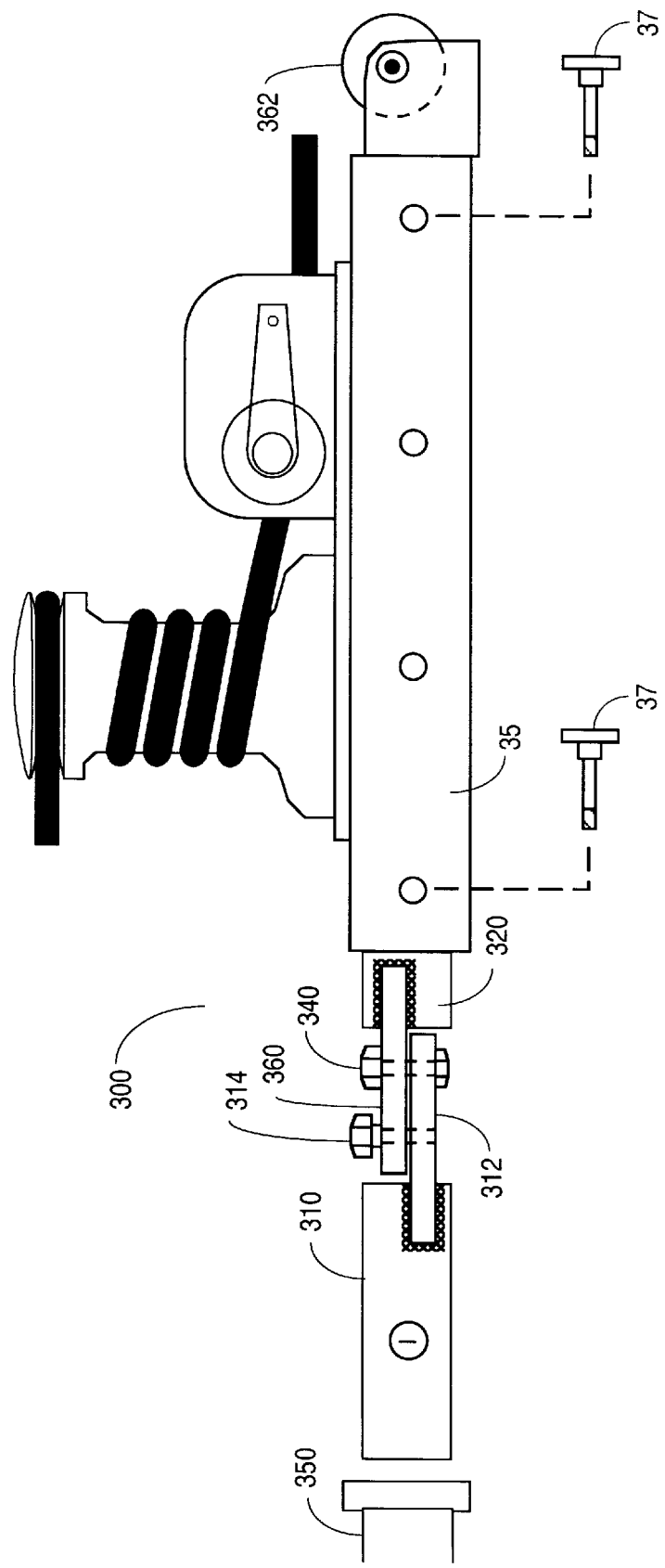
FIG. 11a is a side view of an embodiment of the recovery device of the invention coupled to a second embodiment of a trailer hitch receiver.
Figure 11B:
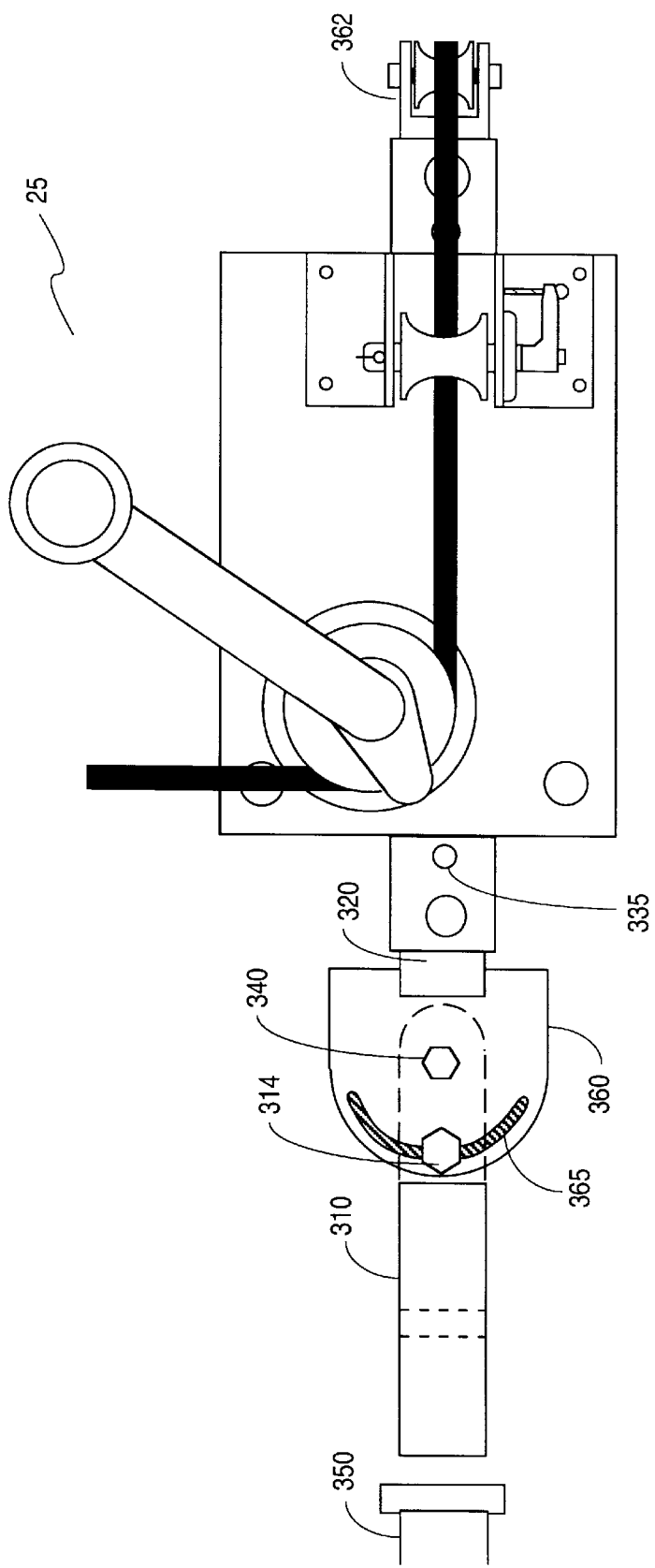
FIG. 11b is a top view of an embodiment of the recovery device of the invention coupled to a second embodiment of a trailer hitch receiver.

FIGS. 11a and 11b show a second embodiment of a trailer hitch sleeve. In this embodiment, arm portion 320 is coupled at its end to rotation plate 360. Rotation plate 360 is coupled at a point 340 by a securing pin or bolt to receiving plate 312 extending from the end of mating portion 310. Point 340 defines a vertical axis about which rotation plate 360 and arm portion 320 may be rotated in a horizontal plane relative to the vertical axis. Rotation plate 360 has a partially arcuate or semi-circular opening 365 extending through its body about point 340. In this manner, sleeve 300 can be held in a position either corresponding to the horizontal axis of trailer hitch receiver 350 or at an angle different than the horizontal axis of trailer hitch receiver 350 by securing pin, rod, or bolt 314 through opening 365 to receiving plate 312 of mating portion 310. Loosening pin, rod, or bolt 314 allows arm portion 320 to be rotated. Tightening pin, rod, or bolt 314 fixes arm portion 320 at a desired point. Finally, in the embodiment shown in FIGS. 11a and 11b, a second end of arm portion 320 contains second guide roller assembly 362 to facilitate guidance of cord 50.

Figure 12A:
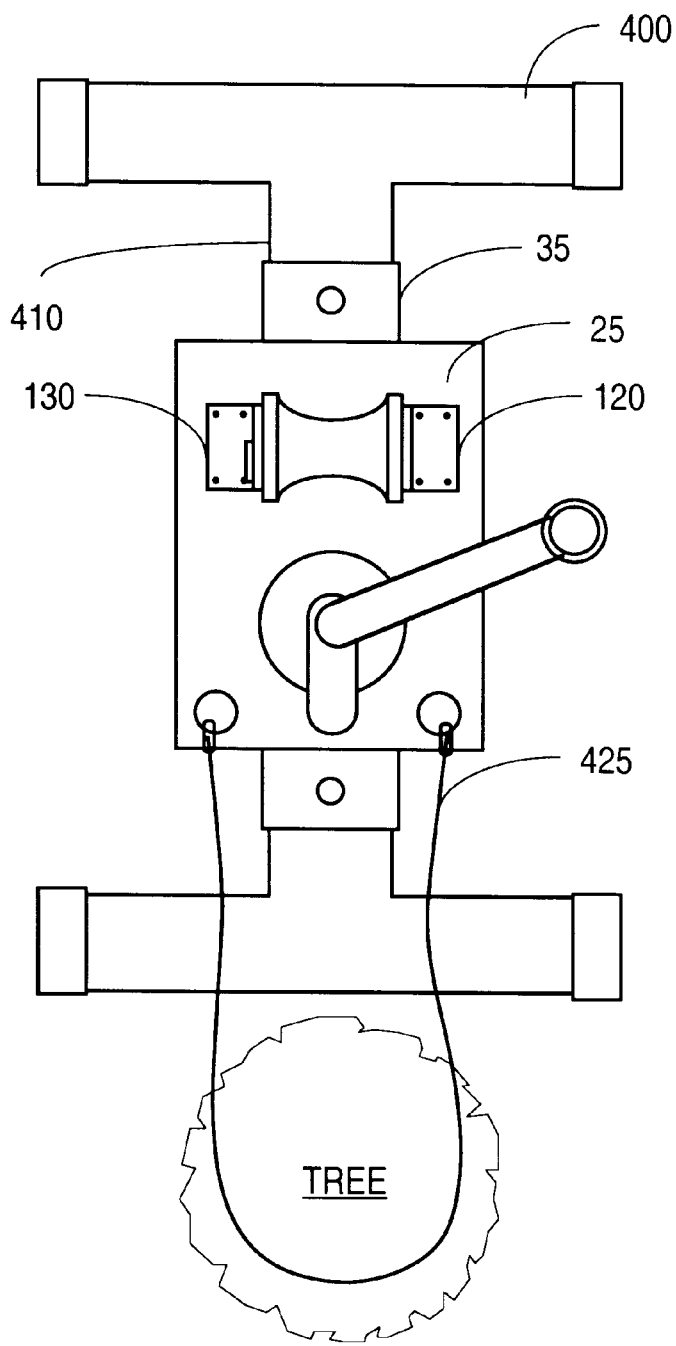
FIG. 12a is a planar top view of a third embodiment of the invention showing an assembly including an embodiment of the recovery device of the invention coupled to an H-support and the assembly coupled to a tree.
Figure 12B:
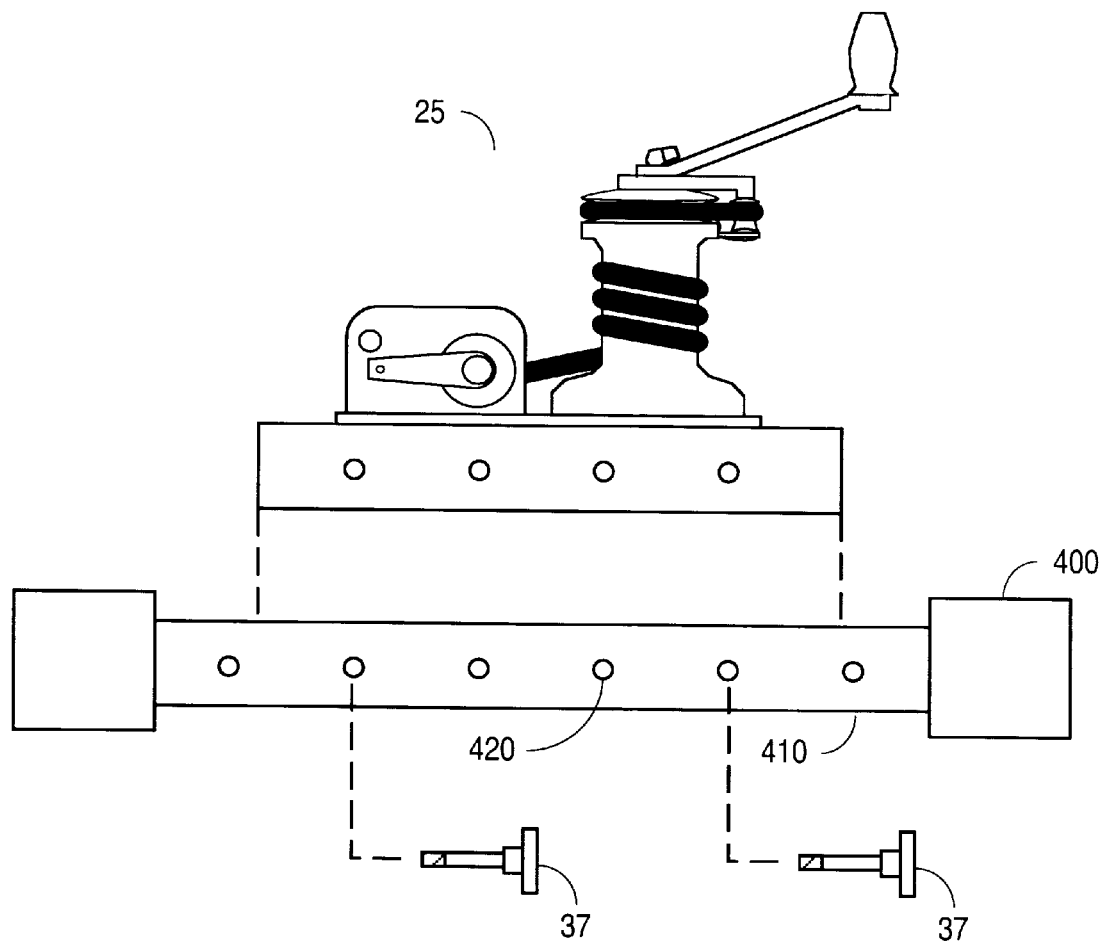

FIGS. 12a and 12b illustrate a third embodiment of the invention wherein recovery device 25 of the invention is assembled to H-support 400. In one embodiment, H-support 400 is made of, for example, hollowed, hard aluminum or steel with an approximately 2 inch by 2 inch rectangular body. As shown in FIG. 12a, recovery device 25 is coupled to center portion 410 of H-support 400, much in the same way as recovery device 25 was coupled to arm portion 320 in the embodiment described with reference to FIGS. 9–11 and the accompanying text. Center portion 410 of H-support 400 contains a number of holes 420 through its body portion to align with similar openings in U-shaped mating member 35 of recovery device 25. In this manner, securing bolts or pins may be inserted through holes in, for example, the walls or base of U-shaped mating member 35 and through center portion 410 of H-portion 400 to secure recovery device 25 to H-portion 400. The legs of H-portion 400 serve to stabilize the assembly. The assembly is particularly useful in remote off-road or backcountry environments where it can be coupled to a load-bearing object, for example, a tree. The assembly is coupled to a tree by coupling a rope, cord, or wire 425 to recovery device 25 and around the load-bearing object.

Figure 13A:
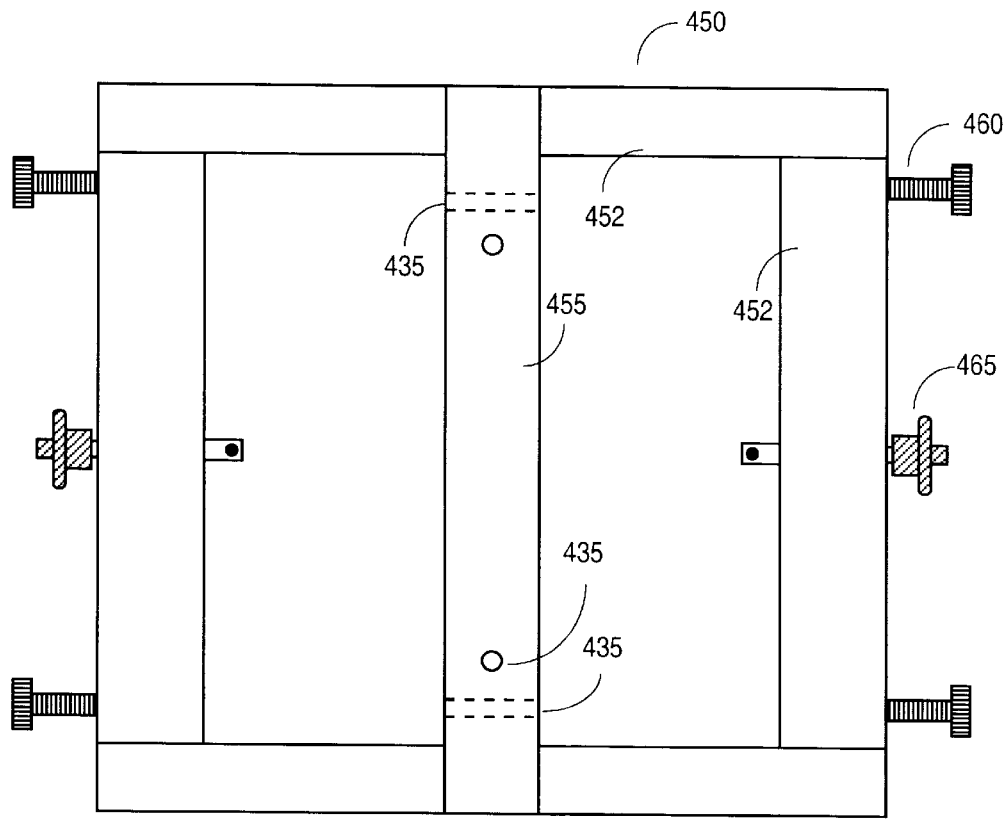
FIG. 13a is a top view of a ladder mount receiver for adapting an embodiment of the recovery device of the invention to a ladder.
Figure 13B:
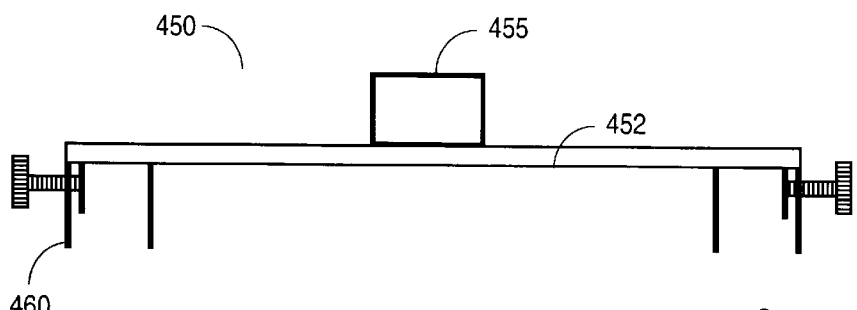
FIG. 13b is a side view of a ladder mount receiver for adapting an embodiment of the recovery device of the invention to a ladder.
Figure 13C:
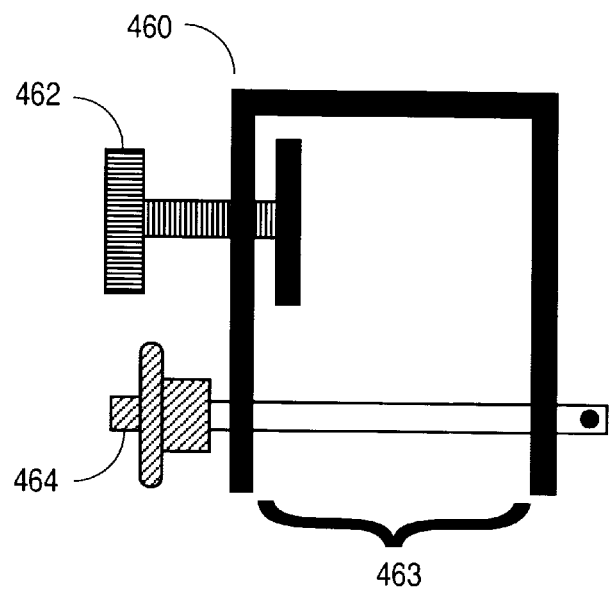
FIG. 13c is a side view of a U-shaped adapter mount of a ladder mount receiver that is configured to couple a ladder mount receiver to a ladder.

FIGS. 13a–13c relate to another embodiment of the invention wherein an embodiment of recovery device 25 is assembled to a ladder. In this embodiment, the invention contemplates the additional part of ladder mount 450. In one embodiment, ladder mount 450 includes opposing rectangular slats 452. Opposing slats 452 form a ladder mount having a width approximately equal to the width of the support members of a ladder. The ladder in this case may be a conventional stand-alone ladder or a ladder configured as part of a rescue vehicle, such as a fire truck. As shown in FIG. 13b, ladder mount 450 attaches to the support members of a ladder through clamping U-joints 460. FIG. 13c is a view of one clamping U-joint 460 having a clamping screw 462 to secure ladder mount 450 to support members of different sizes, e.g., thicknesses. Ladder mount 450 is placed over the support members of a ladder with a support member mating with opening 463 in U-shaped locking member 460.

Once ladder mount 450 is mated to the support members of a ladder, bolts 462 are tightened to clamp ladder mount 450 to the support members. Once fastened, securing pins 464 are placed through parallel openings in the U-shaped mating member 460 of ladder mount 450 to secure ladder mount 450 to the support members of the ladder.

As shown in FIGS. 13a and 13b, ladder mount 450 also includes a center rectangular member 455 coupled to a pair of opposing slats 452, such as, for example, by a weld. Rectangular member 455 is preferably hollowed steel or hard aluminum. In one embodiment, slats 452 are also made of steel or hard aluminum. Rectangular member 455 includes openings 435 extending through its opposing side walls. In one embodiment, openings 435 are aligned with similar openings in U-shaped mating member 35 of the embodiment of recovery device 25 discussed above, such as, for example, with reference to FIGS. 9–11b and the accompanying text. In this manner, securing bolts or pins may be inserted through holes in, for example, the walls or base of U-shaped mating member 35 and through openings 435 in the top or side of rectangular member 435.

Figure 14:
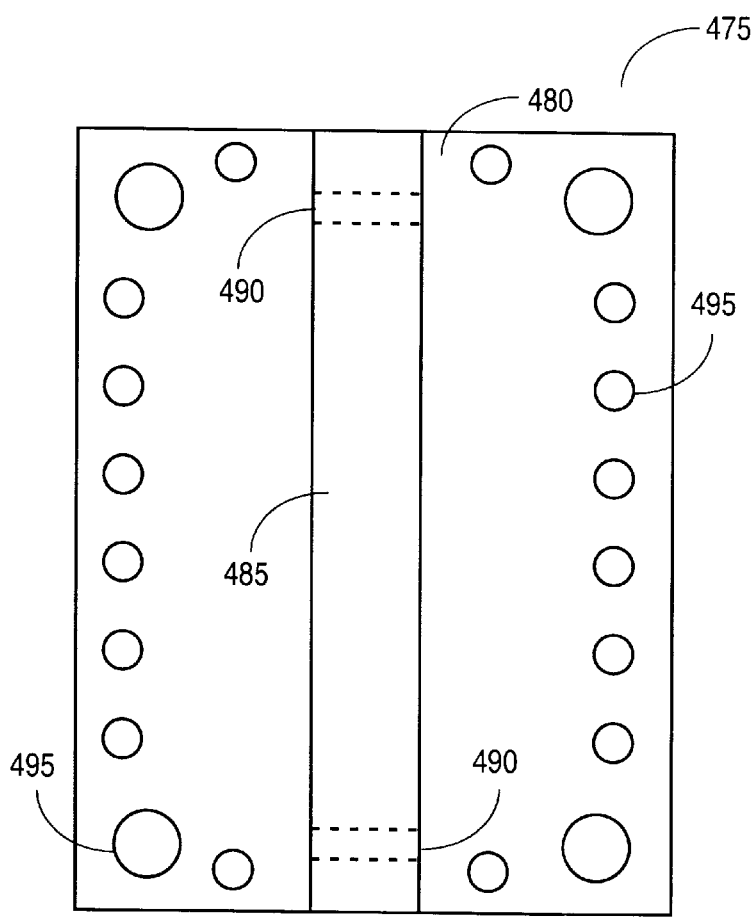
FIG. 14 is a top view of a universal receiver plate for attaching an embodiment of the recovery device of the invention to a load-bearing object.

FIG. 14 shows a still further embodiment of the invention where an embodiment of recovery device 25 such as discussed above, is assembled to a universal mounting plate. In this embodiment, universal mounting plate 475 is a plate of steel or hard aluminum 480 with a center rectangular member 485 coupled to the surface of plate 480. Rectangular member 485 contains openings 490 through its side walls to secure mating of U-shaped mating member 35 of recovery device 25 to universal mount 475. Around the perimeter of universal mount 475 are a plurality of openings 495. Openings 495 allow universal mount 475 to be coupled to a load-bearing object, such as, for example, by rope, wire, cord, nails, spikes, bolts, or screws. In this manner, universal mount 475 serves to adapt recovery device 25 and support recovery device 25 in many different environments.

In the preceding detailed description, the invention is described with reference to specific embodiments thereof. For example, several embodiments of mounting structures to adapt, secure, and support recovery device 25 are presented. In addition, a specific embodiment of recovery device 25 is presented. It is evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A recovery device comprising:

a base plate;

a winch coupled to the base plate;

an anchoring device coupled to the base plate to couple the device to a load bearing object; and a guide roller assembly having:

a first L-shaped angle support having a side portion with a first hole having a diameter;

a second L-shaped angle support having a side portion with a second hole having a diameter wherein the diameter of the second hole is smaller than the diameter of the first hole;

a roller between the first and second angle supports, the roller having a substantially cylindrical shape with concave sides and a first end and a second end and an axial hole, and where the diameter of the first end of the roller is smaller than the diameter of the second end of the roller; and a roller flange having a substantially cylindrical shape and a first end and a second end and an axial hole wherein the diameter of the first end is larger than the diameter of the second end, and wherein the second end is adjacent the first end of the roller and is adapted to be detachably engaged in the first hole of the first L-shaped angle support.

2. The recovery device of claim 1, wherein the load bearing object is one of a derek load management system, a vehicle trailer hitch receiver, and a ladder.

3. The recovery device of claim 2, wherein the guide roller assembly comprises:

a securing rod detachably interposed to the hole of the roller flange and the first hole of the first L-shaped angle support and the hole of the roller and the second L-shaped angle support to secure the roller to the first and second angle supports.

4. The recovery device of claim 3, wherein the securing rod of the guide roller assembly is a ball lock pin.

5. The recovery device of claim 1, wherein the anchoring device comprises:

a U-shaped mating member having a base and opposing side walls and;

one side wall comprising an opening aligned with a corresponding opening in the other side wall;

a portion of the base coupled to a back side of the base plate.

6. The recovery device in claim 1, wherein the anchoring device is a:

U-shaped mounting member having a pair of opposing side walls and a base coupled to a back side of the base plate, the base plate having a first area, the U-shaped mating member extending beyond the first area of the base plate and having a hole in the base of that portion extending beyond the base plate; and an anchoring device to couple the recovery device to the load bearing device through the hole in the U-shaped mating member.

7. The recovery device of claim 6, further comprising:

a sleeve detachably coupled to the U-shaped mating member, the sleeve having an end adapted to be coupled to a trailer hitch receiver.

8. The recovery device of claim 7, wherein the sleeve has an arm portion and a mating portion, the arm portion adapted to be coupled to the recovery device and the mating portion adapted to be coupled to the trailer hitch receiver, the mating portion coupled to the arm portion through an articulating joint, the articulating joint configured to permit the rotation of the arm portion about an axis of the mating portion.

9. The recovery device of claim 8, wherein a coupling point of the arm portion and the mating portion define an axis about which the arm portion is adapted to be rotated, the device further comprising a rotation plate coupled to an end of the arm portion, the rotation plate having an opening with a substantially arcuate shape about the axis, the arm portion adapted to be additionally coupled to the mating portion through the opening.

10. The recovery device of claim 1, wherein the anchoring device is an H-support having a pair of legs coupled by a center portion, the pair of legs adapted to rest on a surface and provide lateral support for the device, the center portion coupled to the base plate, and one of the base plate and the anchoring device adapted to be coupled to a load-bearing object.

11. A recovery device comprising:

a base plate;

means coupled to the base plate for raising or lowering a load;

means coupled to the base plate for coupling the device to a load bearing object; and means coupled to the base plate for guiding a cord between the raising or lowering means and a load, the guide means including a first configuration to guide a cord between the raising or lowering means and an object and a second configuration to release a cord from the guide means with the guide means coupled to the base plate.

12. A guide roller assembly comprising:

a first L-shaped angle support having a base and a side portion with a first hole having a diameter, the base of the first L-shaped angle support being configured to be coupled to a base;

a second L-shaped angle support having a base and a side portion with a second hole having a diameter, wherein the diameter of the second hole is smaller than the diameter of the first hole, the base of the second L-shaped angle support being configured to be coupled to a base plate;

a roller between the first and second angle supports, the roller having a substantially cylindrical shape with concave sides and a first end and a second end and an axial hole, wherein the diameter of the first end of the roller is smaller than the diameter of the second end of the roller;

a roller flange having a substantially cylindrical shape and a first end and a second end and an axial hole, wherein the diameter of the first end is larger than the diameter of the second end, and wherein the second end is adjacent the first end of the roller and is adapted to be detachably engaged in the first hole of the first L-shaped angle support; and a securing rod detachably interposed to the hole of the roller flange and the first hole of the first L-shaped angle support and the hole of the roller and the second L-shaped angle support to secure the roller to the first and second angle supports.

13. A guide assembly comprising:

means for guiding a cord;

first and second means for supporting the guiding means;

means for detaching the guiding means from only one of the first support means and the second support means and leaving the cord free of the guiding means.

* * * * *

UNITED STATES PATENT AND TRADEMARK OFFICE
CERTIFICATE OF CORRECTION

PATENT NO. : 6,059,266
DATED : May 9, 2000
INVENTOR(S) : Ascherin et al.

It is certified that error appears in the above-identified patent and that said Letters Patent is hereby corrected as shown below:

Item [56] References Cited, U.S. Patent Document, please insert the following:

| | | |
|---|---|---|
| -- 2,282,305 | 5/1942 | Bruno . --. |
| -- 2,734,705 | 2/1956 | Robertson . --. |
| -- 2,953,330 | 9/1960 | Lysak . --. |
| -- 2,977,079 | 3/1961 | Calandra . --. |
| -- 3,088,608 | 5/1963 | Theodore . --. |
| -- 3,348,791 | 10/1967 | McKinlay . --. |
| -- 3,805,977 | 4/1974 | Fritzsche et al . --. |
| -- 4,500,056 | 2/1985 | Della-Moretta . --. |
| -- 4,750,691 | 6/1988 | Hollrock et al . --. |
| -- 4,858,855 | 8/1989 | Dalbera . --. |
| -- 4,893,767 | 1/1990 | Ferraro et al. --. |
| -- 5,137,193 | 8/1992 | McDonald . --. |
| -- 5,417, 304 | 5/1995 | Kurtgis . --. |
| -- 5,494,240 | 2/1996 | Waugh . --. |
| -- 5,593,113 | 1/1997 | Cox . --. |

Item [56] References Cited, Foreign Patent Documents, please insert

-- 1233364    5/1971    Great Britain . --.

Signed and Sealed this

Thirteenth Day of November, 2001

Attest:

NICHOLAS P. GODICI
Attesting Officer    Acting Director of the United States Patent and Trademark Office